US008928997B2

(12) United States Patent
Uehara

(10) Patent No.: US 8,928,997 B2
(45) Date of Patent: Jan. 6, 2015

(54) LENS BARREL AND IMAGE PICKUP APPARATUS

(71) Applicant: Canon Kabushiki Kaisha, Tokyo (JP)

(72) Inventor: Takumi Uehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/085,217

(22) Filed: Nov. 20, 2013

(65) Prior Publication Data

US 2014/0146398 A1  May 29, 2014

(30) Foreign Application Priority Data

Nov. 26, 2012  (JP) ................................. 2012-257098

(51) Int. Cl.
*G02B 15/14* (2006.01)
*G02B 7/02* (2006.01)

(52) U.S. Cl.
USPC ............................. 359/700; 359/701; 359/819

(58) Field of Classification Search
USPC .................................. 359/694–704, 811–830
See application file for complete search history.

(56) References Cited

U.S. PATENT DOCUMENTS

2014/0212122 A1*  7/2014  Ishimasa ...................... 396/501

FOREIGN PATENT DOCUMENTS

JP  2004-258646 A  9/2004

* cited by examiner

*Primary Examiner* — Mohammed Hasan
(74) *Attorney, Agent, or Firm* — Cowan, Liebowitz & Latman, P.C.

(57) ABSTRACT

A lens barrel includes a cam ring configured to be rotatably driven, a lens holding cylinder provided on an outer circumference of the cam ring and configured to hold a lens, and a barrier cylinder configured to hold a lens barrier, the barrier cylinder includes a cylinder portion, a first protrusion which extends from the cylinder portion toward an image plane side, and a cam engagement portion which is engaged with a cam groove of the cam ring, the lens holding cylinder includes a cylinder portion and a second protrusion which extends from the cylinder portion toward the image plane side, and the second protrusion of the lens holding cylinder is arranged so as to overlap with the cam engagement portion of the barrier cylinder in a radial direction orthogonal to an optical axis direction.

7 Claims, 5 Drawing Sheets

LENS BARREL AND IMAGE PICKUP APPARATUS

BACKGROUND OF THE INVENTION

1. Field of the Invention

The present invention relates to a lens barrel, and more particularly to a lens barrel having a barrier cylinder.

2. Description of the Related Art

In the related art, a retraction type lens barrel which is movable between a retracted state and an extended state is known. In the lens barrel, retraction and extension of a first lens unit located at the side closest to an object are performed by a rotating cam ring. In addition, the lens barrel includes a lens barrier which is located in front of the first lens unit to cover a lens in the retracted state and to expose the lens in an image shooting state (the extended state).

Japanese Patent Laid-open No. 2004-258646 discloses a barrel structure of a zoom lens including a cam ring, a first lens unit frame which is arranged in an outer circumference of the cam ring to be translatorily guided in an optical axis direction, and a light shielding decorative cylinder which is arranged in the outer circumference of the first lens unit frame and includes a lens barrier. The barrel structure of the zoom lens includes a cam groove for a lens unit frame which is formed on an outer circumference surface of the cam ring to be engaged with a cam follower provided in the first lens unit frame and a cam groove for a decorative cylinder which is engaged with a cam follower provided in the light shielding decorative cylinder. The cam follower of the light shielding decorative cylinder passes through a translatory guide groove, which is formed in the first lens unit frame to be parallel to the optical axis, and is engaged with the cam groove for a decorative cylinder. In addition, the cam groove for a lens unit frame and the cam groove for a decorative cylinder have a shape so that the first lens unit frame and the light shielding decorative cylinder are moved along the same trajectory in the optical axis direction in an imaging zone of the zoom lens. Therefore, since the first lens frame and the light shielding decorative cylinder can be allowed to have different cam trajectories from the retracted state to the extended state, the first lens unit can be extended to the space where the lens barrier is arranged after the lens barrier is opened.

However, in the barrel structure disclosed in Japanese Patent Laid-open No. 2004-258646, a cam follower of the first lens unit frame is formed at a position closer to an image plane side than to the translatory guide groove of the first lens unit frame. In addition, a cam groove of the first lens unit frame formed in the outer circumference of the cam ring and a cam groove of the light shielding decorative cylinder are provided to be aligned in the optical axis direction. Therefore, the lengths of the first lens barrel and the cam ring in the optical axis direction are increased, so that the retraction length of the camera is increased.

In addition, in order to reduce the outer diameter of the lens barrel, it is effective to reduce the thickness of the light shielding decorative cylinder. However, if the thickness of the light shielding decorative cylinder is reduced, deformation may easily occur. Therefore, when an external force is exerted on the lens barrel, the cam follower of the light shielding decorative cylinder on which the external force is exerted may be easily disengaged from the cam groove.

BRIEF SUMMARY OF THE INVENTION

The present invention provides small-sized and highly-reliable lens barrel and image pickup apparatus.

A lens barrel as one aspect of the present invention includes a cam ring configured to be rotatably driven, a lens holding cylinder provided on an outer circumference of the cam ring and configured to hold a lens, and a barrier cylinder configured to hold a lens barrier, the barrier cylinder includes a cylinder portion, a first protrusion which extends from the cylinder portion toward an image plane side, and a cam engagement portion which is engaged with a cam groove of the cam ring, the lens holding cylinder includes a cylinder portion and a second protrusion which extends from the cylinder portion toward the image plane side, and the second protrusion of the lens holding cylinder is arranged so as to overlap with the cam engagement portion of the barrier cylinder in a radial direction orthogonal to an optical axis direction.

An image pickup apparatus as another aspect of the present invention includes the lens barrel.

Further features and aspects of the present invention will become apparent from the following description of exemplary embodiments with reference to the attached drawings.

DETAILED DESCRIPTION OF THE PREFERRED EMBODIMENTS

Figure 1:
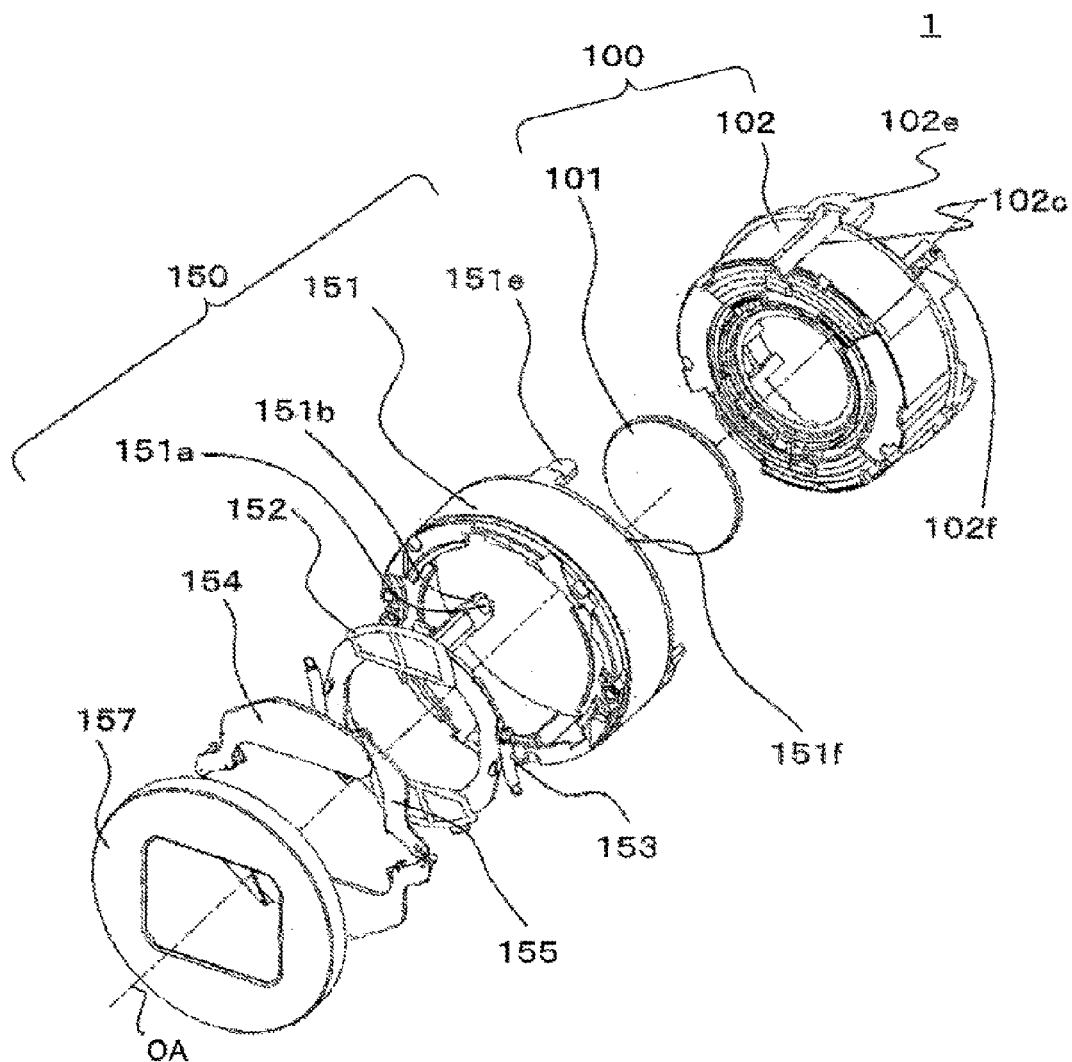
FIG. 1 is an exploded perspective view illustrating a first lens unit and a barrier cylinder constituting a lens barrel in the present embodiment.

Hereinafter, embodiments of the present invention will be described with reference to the drawings. In addition, in each figure, the same components are denoted by the same reference numerals, and redundant description thereof is not present.

Figure 2:
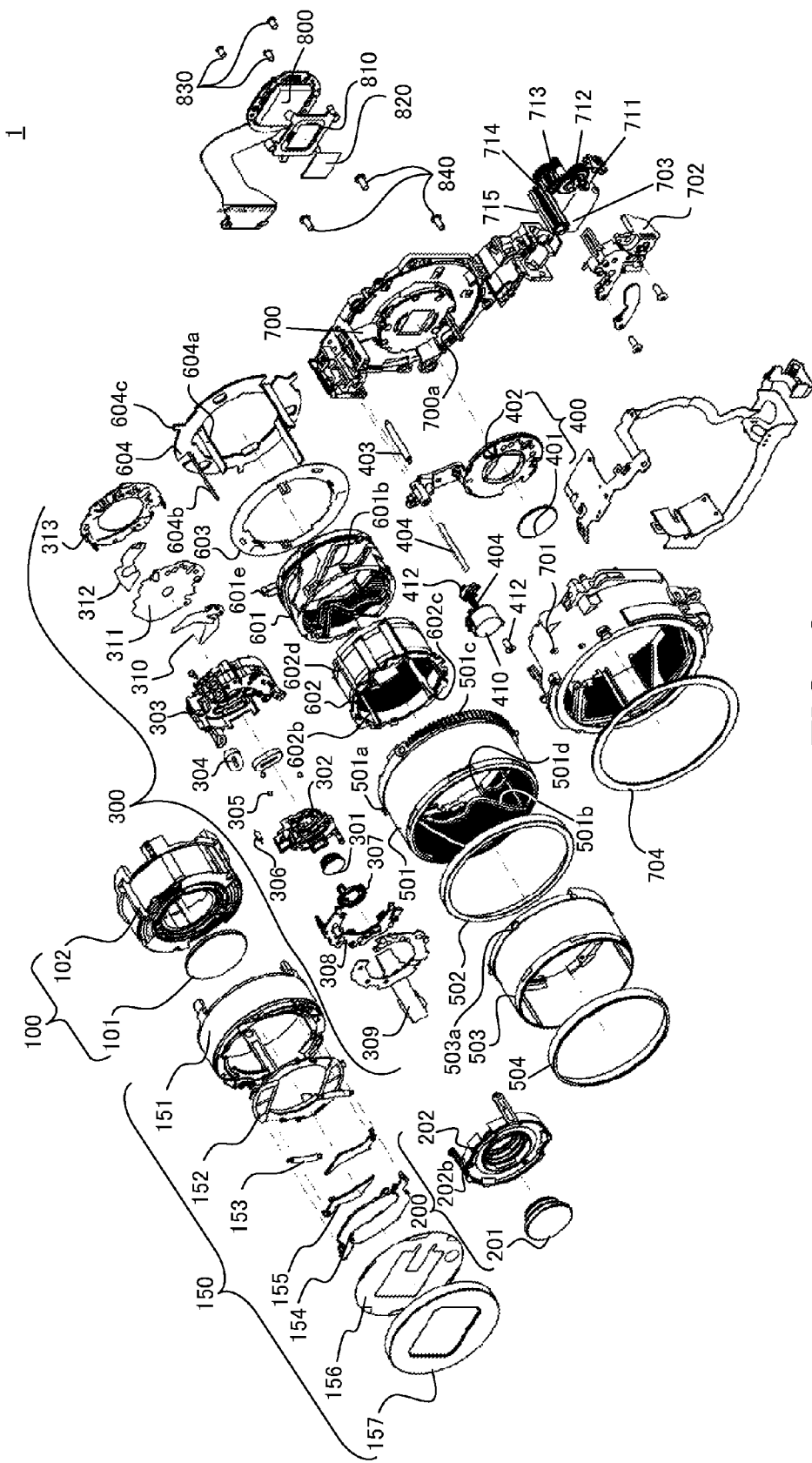
FIG. 2 is an exploded perspective view illustrating the lens barrel (a barrel unit) in the present embodiment.
Figure 3:
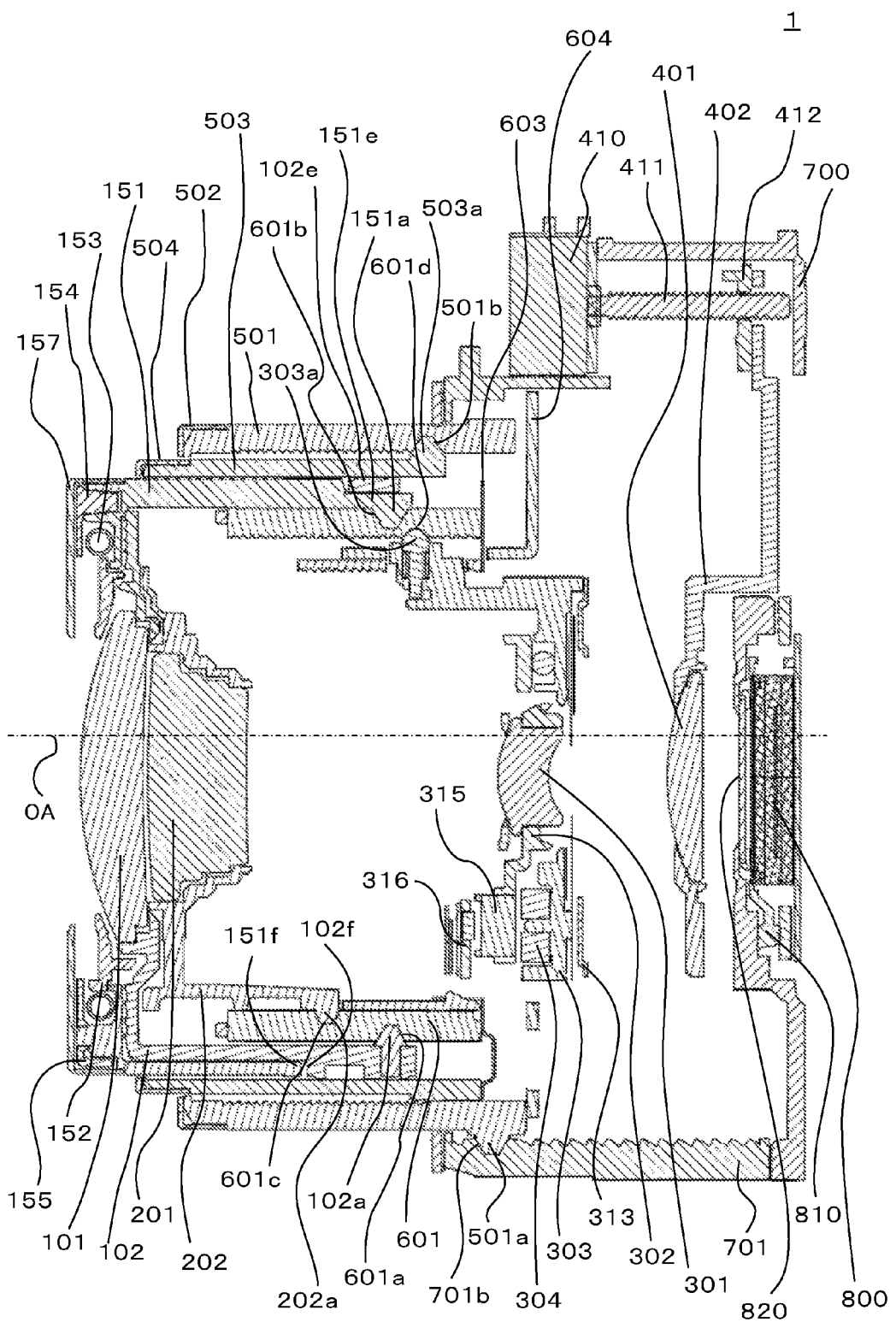
FIG. 3 is a cross-sectional view illustrating an image shooting state (an extended state) of the lens barrel in the present embodiment.
Figure 4:
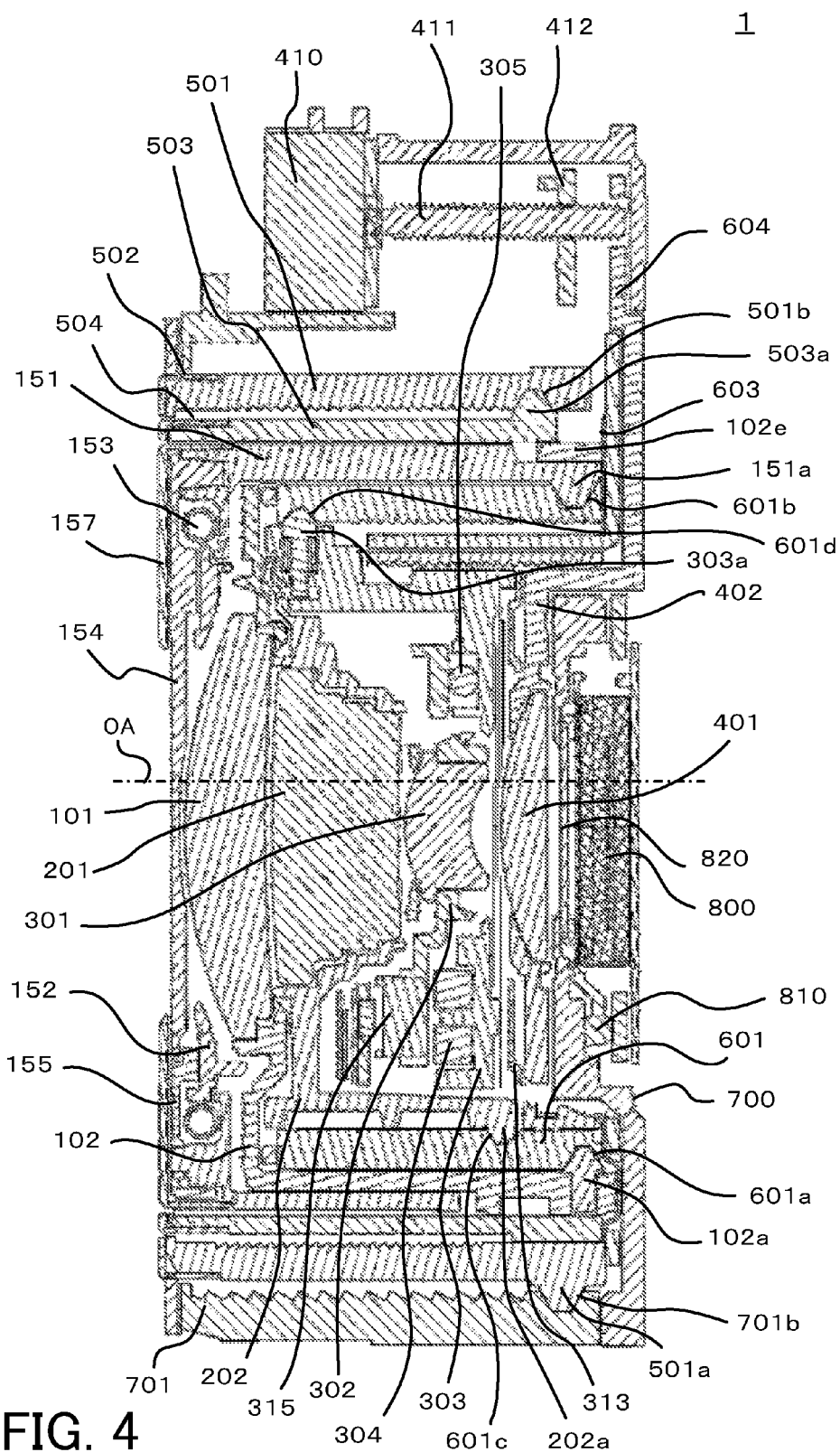
FIG. 4 is a cross-sectional view illustrating a retracted state of the lens barrel in the present embodiment.

First of all, referring to FIGS. 1 to 4, a configuration of a lens barrel in the present embodiment will be described. FIG. 1 is an exploded perspective view illustrating a first lens unit 100 and a barrier unit 150 of a lens barrel 1. FIG. 2 is an exploded perspective view illustrating the lens barrel 1 (a barrel unit). FIG. 3 is a cross-sectional view illustrating an image shooting state (an extended state) of the lens barrel 1. FIG. 4 is a cross-sectional view illustrating a retracted state of the lens barrel 1.

The first lens unit 100 is configured to include a first lens 101 and a cylindrical first lens frame 102 (a lens holding cylinder) which holds the first lens 101. The first lens frame 102 is a lens frame which is provided on an outer circumference of a cam cylinder 601 so as to be translatorily guided in the direction of an optical axis OA (in the optical axis direction) and to hold the lens (first lens 101) at a side closest to an object. Cam pins 102a (cam engagement portions) which protrude inward in the radial direction and are arranged at an interval of an equal angle in the inner circumferential direction and a key groove (not shown) which restricts the rotation of the first lens unit 100 are provided on the inner circumferential surface of the first lens frame 102. In addition, key grooves 102c which restrict the rotation of the barrier unit are provided on the outer circumferential surface of the first lens frame 102 at an interval of an equal angle so that a cylinder portion of the first lens frame 102 is notched in the direction of the optical axis OA (in the optical axis direction). In the embodiment, the cam pins 102a and the first lens frame 102 are configured by using different components, but the present invention is not limited to this. The cam pins 102a may be configured integrally with the first lens frame 102.

The barrier unit 150 is configured to include a barrier cylinder 151, a barrier drive ring 152, a barrier opening spring 153, a barrier main blade 154, a barrier auxiliary blade 155, a cap tape 156, and a cap 157. The barrier cylinder 151 is provided on the outer circumference of the first lens frame 102 to hold the lens barrier (the barrier drive ring 152, the barrier opening spring 153, the barrier main blade 154, the barrier auxiliary blade 155, the cap tape 156, and the cap 157).

The cap 157 is attached to the object side of the barrier cylinder 151 by the cap tape 156. Cam pins 151a (cam engagement portions) which protrude inward in the radial direction and are arranged at an interval of an equal angle in the inner circumferential direction are provided on the inner circumferential surface of the barrier cylinder 151. In addition, a translatory key 151b which restricts the rotation of the barrier unit 150 is provided in the base portion of the cam pin 151a. Namely, the barrier cylinder 151 includes the cylinder portion (a main body portion of the barrier cylinder 151), the first protrusions (translatory keys 151b) extending from the cylinder portion to the image plane side, and the cam pins 151a which are fitted into the cam grooves 601b of the cam cylinder 601. The translatory key 151b is fitted into the key groove 102c of the first lens frame 102 so as to be translatorily guided.

A second lens unit 200 is configured to include a second lens 201 and a cylindrical second lens frame 202 which holds a second lens 201. Cam pins 202a (cam engagement portions) which protrude outward in the radial direction and are arranged at an interval of an equal angle in the outer circumferential direction and a translatory key 202b which restricts the rotation of the second lens unit 200 are provided on the outer circumferential surface of the second lens frame 202.

The third lens unit 300 is configured to include a shutter blade 310, an ND filter 312, a separate sheet 311, a shutter cover 313, and a shutter Act (not shown) that are a light amount adjusting member at the imaging plane side of a three-unit base 303. In addition, the third lens unit 300 is configured to include a third lens 301 and a third lens frame 302 at the object side of the three-unit base 303. Furthermore, the third lens unit 300 is configured to include an IS coil 304, an IS ball 305, an IS spring 306, a cap 307, an IS holder 308, an FPC 309, and an IS sensor 316 fixed to the FPC 309 at the object side.

The third lens frame 302 holds the third lens 301, and the cap 307 which restricts the light amount of the object side is attached to the third lens frame 302. In addition, the third lens frame 302 holds an IS magnet 315 and is movably held to the three-unit base 303 by the functions of the IS ball 305 and the IS spring 306. Furthermore, the third lens frame 302 is moved to an arbitrary position based on a driving force generated by the functions of the IS coil 304 and the IS magnet 315, and the position thereof is controlled by the IS sensor 316.

A translatory cylinder 602 which is freely capable of rotating with respect to the cam cylinder 601 (a cam ring) and is incapable of rotating with respect to a translatory plate 604 and which restricts the rotation of the first lens unit 100, the second lens unit 200, and the third lens unit 300 to translatorily guide in the optical axis direction is provided inside the first lens frame 102. The cam cylinder 601 is configured so as to be rotatably driven. A key groove 602d which is fitted into a translatory key 604a of the translatory plate 604 and restricts the rotation thereof is provided on the outer circumferential surface of the translatory cylinder 602, and a translatory key 602a which is fitted into the key groove 102b of the first lens frame 102 is provided at the object side. In addition, key grooves 602b which penetrate for restricting the rotation of a translatory key 202b of the second lens frame 202 and key grooves 602c which penetrate for restricting the rotation of a translatory key 303b of the three-unit base 303 are arranged at an interval of an equal angle on the inner circumferential surface of the translatory cylinder 602. A light shielding plate 603 which blocks harmful light is attached to the imaging plane side of the translatory cylinder 602. The outer circumferential surface of the translatory cylinder 602 is fitted into the inner surface of the cam cylinder 601 and is bayonet-coupled with the cam cylinder 601, so that the translatory cylinder 602 is held rotatably relative to the cam cylinder 601.

A translatory key 604a which is fitted into a key groove 602d of the translatory cylinder 602 extending in the optical axis direction and a translatory key 604b which is fitted into a key groove 503b of a cover cylinder 503 are included in the translatory plate 604. In addition, the translatory plate 604 is bayonet-coupled with the cam cover 501, so that the translatory plate 604 is held rotatably relative to a cam cover 501. Furthermore, translatory keys 604a which are fitted into key grooves 701a provided on the inner circumferential surface of a fixed cylinder 701 to be translatorily restricted are provided in the translatory plate 604 at an interval of an equal angle.

A cover cylinder 503 which is rotation-restricted with respect to the translatory plate 604 and is moved forward and backward in the optical axis direction by the cam cover 501 is provided in the outer circumferential portion of the cam cylinder 601. A key groove 503b which is fitted into the translatory key 604b of the translatory plate 604 is provided on the inner circumferential surface of the cover cylinder 503. In addition, cam pins 503a (cam engagement portions) which protrude outward in the radial direction and are inserted into cam grooves 501b provided on the inner surface of the cam cover 501 and which are provided at an interval of an equal angle in the outer circumferential direction are provided on the outer circumferential surface of the cover cylinder 503. A cam cover ring 504 which reinforces and decorates the cover cylinder 503 is attached to the object side of the cover cylinder 503.

Cam pins 501a (cam engagement portions) which protrude outward in the radial direction and are inserted into cam grooves 701b provided on the inner circumferential surface of the fixed cylinder 701 and which are arranged at an interval of an equal angle in the outer circumferential direction are provided on the outer circumferential surface of the cam cover 501. In addition, a gear portion 501c coupled to a fifth gear is provided on the outer circumferential surface of the cam cover 501. Cam grooves 501b into which the cam pins 503a of the cover cylinder 503 are inserted are provided on the inner circumferential surface of the cam cover 501 at an interval of an equal angle, and key grooves 501d which are fitted into rotation keys 601e of the cam cylinder 601 are provided on the inner circumferential surface of the cam cover 501. Furthermore, a cam cylinder ring 502 which reinforces and decorates the cam cover 501 is provided at the object side of the cam cover 501.

Cam grooves 601c into which cam pins 202a (cam engagement portions) of the second lens frame 202 are inserted, and cam grooves 601d into which cam pins 303a (cam engagement portions) of the three-unit base 303 are inserted are provided on the inner circumferential surface of the cam cylinder 601 at an interval of an equal angle. Cam grooves 601a into which cam pins 102a of the first lens frame 102 are inserted, and cam grooves 601b into which cam pins 151a of the barrier cylinder 151 are inserted are provided on the outer circumferential surface of the cam cylinder 601 at an interval of an equal angle. In addition, rotation keys 601e which are fitted into the key grooves 501d of the cam cover 501 are provided. The cam cylinder 601 is bayonet-coupled with the cover cylinder 503 to be rotatably held with respect to the cover cylinder 503 by the functions of the translatory cylinder 602, the translatory plate 604, and the cam cover 501 and is moved forward and backward in the optical axis direction by the function of the cam cover 501.

The fixed cylinder 701 is arranged at the outer circumference of the cam cover 501. Key grooves 701a which are fitted into the translatory keys 604a of the translatory plate 604 to restrict the rotation thereof, and cam grooves 701b into which the cam pins 501a of the cam cover 501 are inserted are provided on the inner circumferential surface of the fixed cylinder 701 at an interval of an equal angle. In addition, a sand proof sheet 704 which prevents extraneous materials from entering the inside of the lens barrel 1 is provided at the object side of the fixed cylinder 701.

A sensor holder 700 holds a drive source 410 of a fourth lens unit 400, a main guide 404 of the fourth lens unit 400, a drive source 703 of the lens barrel 1, and gears 711 to 715 which transmit a driving power of the drive source 703 to the cam cover 501. The gears 711 to 714 are held on the sensor holder 700 by a gear cover 702. The gear 715 is held by the fixed cylinder 701 and the sensor holder 700.

The fourth lens unit 400 is configured to include a fourth lens 401 and a fourth lens holding frame 402. The fourth lens unit 400 is rotation-restrained by a main guide 404 and a sub guide 700a provided on the sensor holder 700. The fourth lens unit 400 is movably arranged in the optical axis direction by a nut 412 which is screw-engaged with a screw 411 provided in the drive source 410 to be moved forward and backward in the optical axis direction by the rotation of the drive source 410 and a spring 403 which abuts the fourth lens holding frame 402 and the nut 412.

When an image pickup element 800 is fixed to the sensor holder 700, a protection glass 820 is fixed so as to press on the sensor holder 700 by using elasticity of a sensor rubber 810 attached by a screw 830. The sensor holder 700 and the fixed cylinder 701 are fixed by a screw 840, and thus the lens barrel 1 is unitized. In the embodiment, in the case where the lens barrel 1 is transitioned from the retracted state to the image shooting state (the extended state), first of all, the gears 711 to 715 are rotated by the driving force of the drive source 703, and subsequently the cam cover 501 is driven to rotate.

The cam cover 501 is fitted into the inside of the fixed cylinder 701 and extends while rotating in the optical axis direction by the function of the cam grooves 701b provided in its inside. When the cam cover 501 rotates, the cam cylinder 601 extends while rotating in the optical axis direction by the functions of the cam cover 501, the translatory plate 604, the translatory cylinder 602, and the cover cylinder 503.

The translatory cylinder 602 is rotatably held relative to the cam cylinder 601 through the bayonet-coupling, and is rotation-restricted by the translatory plate 604. Therefore, when the cam cylinder 601 rotates, the translatory cylinder 602 extends while translatorily moving in the optical axis direction. The first lens unit 100 which is cam-coupled to the cam cylinder 601, the barrier unit 150, the second lens unit 200, and the third lens unit 300 extend while translatorily moving in the optical axis direction by the functions of the cam cylinder 601 and the translatory cylinder 602.

The fourth lens unit 400 is held movably in the optical axis direction by the functions of the screw 411 and the nut 412 provided in the drive source 410 and is rotation-restricted by the main guide 404 and the sub guide 700a. Therefore, the fourth lens unit 400 extends while translatorily moving in the optical axis direction independently irrespective of the movement of the cam cylinder 601.

According to the configuration described hereinbefore, the cam cover 501 rotates and each lens unit extends from the retraction position toward the object side, and thus the lens barrel 1 is transitioned from the retracted state to the image shooting state (the extended state). In the embodiment, since the cam grooves are set so that the moving distance of the first lens unit 100 is larger than the moving distance of the barrier unit 150, the first lens unit 100 can be extended into the space from which the barrier has retreated. In addition, in the lens barrel 1 of the embodiment, by the functions of the fixed cylinder 701, the cam cover 501, and the cam cylinder 601, distances between them are appropriately adjusted so that zooming is performed.

Next, the configuration of the first lens unit 100 and the barrier unit 150 in the embodiment will be described in detail. Notch-shaped key grooves 102c (notch grooves) extending in the optical axis direction are provided on the first lens frame 102. In the assembling, the cam pins 151a of the barrier cylinder 151 are inserted into the key grooves 102c to be fitted into the translatory keys 151b of the barrier cylinder 151 so as to restrict the rotation of the barrier cylinder 151. In addition, the first lens frame 102 maintains the cylinder shape and rigidity by a component 102e (an end portion terminating the key groove 102c at the image plane side) having a shape of bridging the key groove 102c at the end portion of the image pickup plane side.

A thinning portion 151e is provided on the outer circumferential surface of the cam pin 151a of the barrier cylinder 151. The thinning portion 151e of the barrier cylinder 151 is formed to be thinner than other portions of the barrier cylinder 151 in the radial direction. Therefore, the thinning portion 151e of the barrier cylinder 151 has a diameter smaller than each of diameters of other portions of the barrier cylinder 151. In the assembled state of the lens barrel 1, a component 102e having a bridge shape of the first lens frame 102 is arranged in a thinning space of a thinning portion 151e. The follower pin (cam pin 102a) of the first lens frame 102 and the follower pin (cam pin 151a) of the barrier cylinder 151 are arranged in different phases from each other. In addition, the follower pin (cam pin 102a) of the first lens frame 102 and the follower pin (cam pin 151a) of the barrier cylinder 151 are arranged at the position where the follower pins overlap with each other in the optical axis direction.

In the configuration in the related art, the component 102e having a bridge shape is formed closer to the image pickup plane side than to the cam pin 151a of the barrier cylinder arranged within the key groove 102c. In addition, the cam pin 102a of the first lens frame 102 is provided on the component 102e. Meanwhile, in the embodiment, it is possible to arrange the component 102e at the position where the component 102e overlaps with the cam pin 151a of the barrier cylinder 151 in the optical axis direction. In addition, it is possible to arrange the cam pin 102a of the first lens frame 102 at the position where the cam pin 102a overlaps with the cam pin 151a of the barrier cylinder 151 in the optical axis direction. Therefore, the total length of the first lens frame 102 is reduced, and thus the retraction length of the lens barrel 1 is shortened.

In addition, the component 102e of the first lens frame 102 is arranged within the thinning portion 151e of the barrier cylinder 151, and the outer diameter of the component 102e of the first lens frame 102 and the outer diameter of the barrier cylinder 151 are formed to be equal to each other or substantially equal to each other. Therefore, without an increase in outer diameter of the lens barrel 1, it is possible to arrange the component 102e at the outer side of the cam pin 151a of the barrier cylinder 151 and at the position where the component 102e overlaps with the cam pin 151a in the optical axis direction.

In the embodiment, an impact receiving surface 151f of the barrier cylinder 151 and an impact receiving surface 102f of the first lens frame 102 are provided in the phases where the cam pins 102a of the first lens frame 102 are provided. The barrier cylinder 151 and the first lens frame 102 are moved relative to each other in the optical axis direction in the image shooting state, and the impact receiving surfaces 151f and 102f are configured to particularly approach each other in the image shooting state.

In the image shooting state, when an image pickup apparatus having the lens barrel 1 drops or an external force such as impact is exerted thereon, a strong force in the pushing direction is applied to the barrier cylinder 151 located at the side closest to the object. When the external force in the pushing direction is applied to the barrier cylinder 151, the entirety of the barrier cylinder 151 is deformed in the direction where the cam pin 151a and the cam groove 601a are disengaged. If the deformation amount exceeds the depth of the engagement of the cam pin 151a and the cam groove 601a, the disengaged lens barrel 1 may be damaged.

Therefore, in the lens barrel 1 of the embodiment, the component 102e of the first lens frame 102 is arranged at the outer circumferential side of the cam pin 151a of the barrier cylinder 151. Therefore, when the barrier cylinder 151 receives an external force so as to be deformed in the direction where the cam pin 151a is disengaged from the cam groove 601a, the outer circumferential side of the cam pin 151a is allowed to abut the component 102e of the first lens frame 102, so as to reduce further deformation. Therefore, according to the embodiment, the lens barrel 1 which is hardly damaged by falling or impact can be provided.

In addition, the impact receiving surface 102f of the first lens frame 102 and the impact receiving surface 151f of the barrier cylinder 151 are provided in the phase substantially equal to the phase of the cam pin 102a of the first lens frame 102. Since the impact receiving surfaces approach each other in the image shooting state (the extended state), when the barrier cylinder is deformed due to falling or impact in the image shooting state, the impact receiving surfaces are allowed to abut each other. Since the impact receiving surfaces are provided just above the cam pin 102a of the first lens frame, the force pushing the barrier cylinder 151 to the image plane side is efficiently transmitted to the cam pin 102a of the first lens frame. Therefore, by allowing both of the cam pin 151a of the barrier cylinder and the cam pin 102a of the first lens frame to support the external force applied on the barrier cylinder 151, the lens barrel is formed to be further hardly damaged by falling or impact.

In the related art, the portion having a shape of bridging the key groove 102c of the first lens frame 102 is formed at the position closer to the image plane side than to the cam pin of the barrier cylinder. On the other hand, in the embodiment, the component 102e having a bridge shape is formed at the position where the component 102e overlaps with the cam pin 151a of the barrier cylinder 151 in the optical axis direction. Therefore, the length of the first lens frame 102 in the optical axis direction can be shortened. Thus, the retraction length of the lens barrel 1 is shortened, and a thinner image pickup apparatus can be provided.

In the related art, in a case where the image pickup apparatus receives an external force due to falling, impact, or the like in the image shooting state, there is no component preventing the barrier cylinder from being deformed in the direction where the cam pin of the barrier cylinder is disengaged from the cam groove. On the other hand, in the embodiment, the component 102e having a bridge shape of the first lens frame 102 is formed on the outer circumference of the cam pin 151a of the barrier cylinder 151, and thus the component 102e prevents the follower pin 151a of the barrier cylinder 151 from being disengaged from the cam groove 610a. Therefore, even when an external force is applied through falling, impact, or the like, the cam pin 151a of the barrier cylinder 151 is hardly disengaged from the cam groove 601a.

In the related art, there is no configuration for dispersing an external force applied on the barrier cylinder 151 due to falling, impact, or the like over the first lens frame 102. On the other hand, in the embodiment, the impact receiving surfaces 151f and 102f are provided just above the cam pin 102a of the first lens frame 102, and thus the external force due to falling, impact, or the like can be dispersed into both of the barrier cylinder 151 and the first lens frame 102. Therefore, a lens barrel which is further hardly damaged by falling or impact can be provided.

Figure 5:
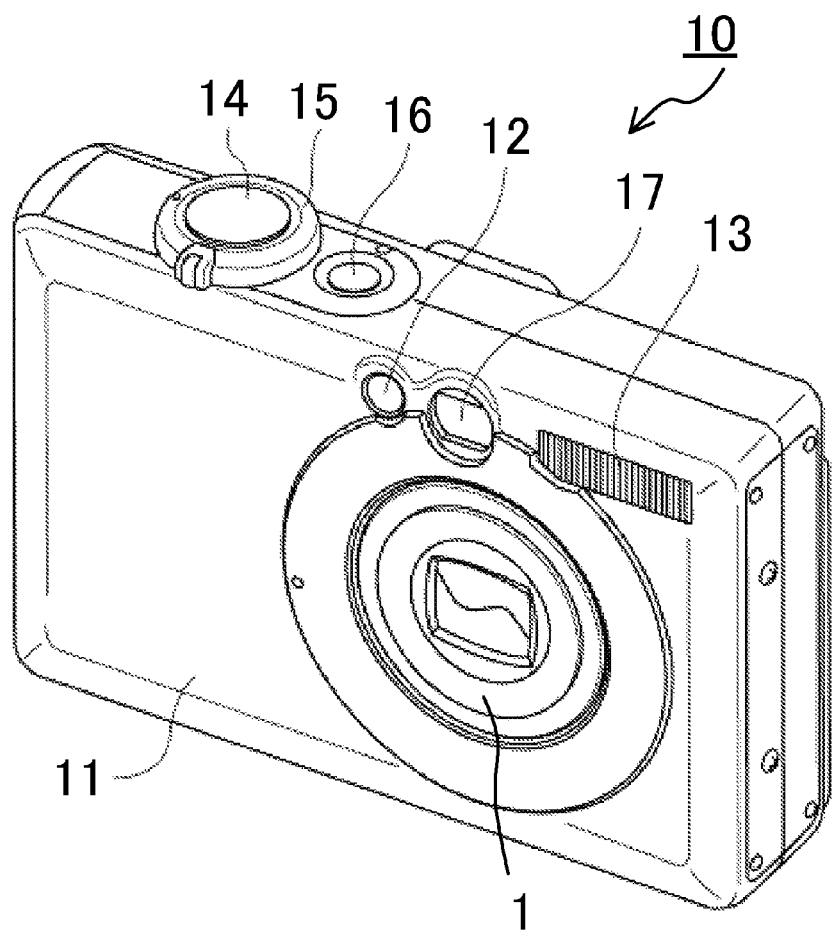
FIG. 5 is a perspective view illustrating an outer appearance of an image pickup apparatus in the present embodiment.

Next, referring to FIG. 5, an outline of an image pickup apparatus including the lens barrel 1 in the embodiment will be described. FIG. 5 is a perspective view illustrating an outer appearance of an image pickup apparatus 10 (a digital camera) in the embodiment. As illustrated in FIG. 5, the image pickup apparatus 10 is configured to include an image pickup apparatus main body 11 and a lens barrel 1 attached to the image pickup apparatus main body 11. A finder object lens 17 for determining a composition of an object, an auxiliary lighting unit 12 which provides an auxiliary light source for performing a photometry operation or a distance measurement operation, a strobe 13, and the lens barrel 1 (a lens apparatus) are provided on the front surface of the image pickup apparatus 10. In addition, a release button 14, a zooming switch 15, and a power switching button 16 are provided on the top surface of the image pickup apparatus main body 11. In the embodiment, the lens barrel 1 is configured to be movable between the retracted state and the extended state (the image shooting state).

The lens barrel 1 includes the cam cylinder 601 (the cam ring), the lens frame (the first lens frame 102) which is provided at the outer circumference of the cam cylinder 601 to hold the lens (the first lens 101) at the side closest to the object, and the barrier cylinder which is provided at the outer circumference of the lens frame to hold the lens barrier. The cam groove (the cam groove 601a) for the lens frame which is engaged with the cam pin 102a of the first lens frame 102 and the cam groove (the cam groove 601b) for the barrier cylinder which is engaged with the cam pin 151a of the barrier cylinder 151 are provided at the outer circumferential surface of the cam cylinder 601. In addition, the notch groove (the key groove 102c) along the optical axis direction into which the cam pin 151a of the barrier cylinder 151 is inserted and the end portion (the component 102e) which terminates the key groove 102c at the image plane side are provided on the first lens frame 102. Namely, the first lens frame 102 includes the cylinder portion (the main body portion of the first lens frame 102) and the second protrusion (the component 102e) extending from the cylinder portion toward the image plane side. In addition, the component 102e of the first lens frame 102 is arranged so as to be at position closer to the outer side than to the cam pin 151a of the barrier cylinder 151 in the radial direction orthogonal to the optical axis direction and so as to overlap with the cam pin 151a of the barrier cylinder 151. Namely, the component 102e and the cam pin 151a are arranged to overlap with each other in the up-down direction in FIGS. 3 and 4.

Preferably, the cam pin 151a of the barrier cylinder 151 and the cam pin 102a of the first lens frame 102 are arranged in different phases from each other in the plane orthogonal to the optical axis direction. More preferably, the cam pin 151a of the barrier cylinder 151 is provided in the thinning portion 151e of the barrier cylinder 151, and the component 102e of the first lens frame 102 is provided to overlap with the thinning portion 151e of the barrier cylinder 151 in the radial direction. More preferably, the impact receiving surface 102f which receives an impact from the barrier cylinder 151 in the extended state is provided in the first lens frame 102 at the object side of the cam pin 102a of the first lens frame 102.

Thus, the lens barrel of the embodiment is configured so that the distance between the first lens frame and the cam ring in the optical axis direction is shortened and the cam follower (cam pin) of the first lens frame and the cam follower (cam pin) of the barrier cylinder are hardly disengaged from the cam groove of the cam ring even in the case where an external force is exerted. Therefore, according to the embodiment, small-sized and highly-reliable lens barrel and image pickup apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-257098, filed on Nov. 26, 2012, which is hereby incorporated by reference herein in its entirety.

What is claimed is:

1. A lens barrel comprising:
   a cam ring configured to be rotatably driven;
   a lens holding cylinder provided on an outer circumference of the cam ring and configured to hold a lens; and
   a barrier cylinder configured to hold a lens barrier,
   wherein the barrier cylinder includes a cylinder portion, a first protrusion which extends from the cylinder portion toward an image plane side, and a cam engagement portion which is engaged with a cam groove of the cam ring,
   wherein the lens holding cylinder includes a cylinder portion and a second protrusion which extends from the cylinder portion toward the image plane side, and
   wherein the second protrusion of the lens holding cylinder is arranged so as to overlap with the cam engagement portion of the barrier cylinder in a radial direction orthogonal to an optical axis direction.

2. The lens barrel according to claim 1,
   wherein the lens holding cylinder is provided on the outer circumference of the cam ring,
   wherein the barrier cylinder is provided on an outer circumference of the lens holding cylinder, and the cam engagement portion is provided inside the first protrusion, and
   wherein the second protrusion of the lens holding cylinder is arranged outside the cam engagement portion of the barrier cylinder so as to overlap with the cam engagement portion of the barrier cylinder in the radial direction.

3. The lens barrel according to claim 2,
   wherein the lens holding cylinder is provided with a notch groove along the optical axis direction into which the first protrusion of the barrier cylinder is inserted and an end portion which terminates the notch groove at the image plane side, and
   wherein the end portion of the lens holding cylinder is provided outside the cam engagement portion of the barrier cylinder so as to overlap with the cam engagement portion of the barrier cylinder in the radial direction.

4. The lens barrel according to claim 2,
   wherein the lens holding cylinder has a cam engagement portion in a phase different from a phase of the second protrusion,
   wherein a cam groove for the lens holding cylinder which is engaged with the cam engagement portion of the lens holding cylinder is provided on an outer circumference surface of the cam ring, and
   wherein the cam engagement portion of the barrier cylinder and the cam engagement portion of the lens holding cylinder are provided in different phases from each other in a circumferential direction of the lens barrel.

5. The lens barrel according to claim 4, wherein the cam engagement portion of the barrier cylinder and the cam engagement portion of the lens holding cylinder are provided at positions which overlap with each other in the optical axis direction.

6. The lens barrel according to claim 4,
   wherein an impact receiving surface of the lens holding cylinder and an impact receiving surface of the barrier cylinder are provided in a phase equal to a phase of the cam engagement portion of the lens holding cylinder in the circumferential direction of the lens barrel, and
   wherein the impact receiving surface of the lens holding cylinder and the impact receiving surface of the barrier cylinder overlap with each other in an image shooting state when viewed from the optical axis direction.

7. An image pickup apparatus comprising the lens barrel according to claim 1.

* * * * *